July 29, 1958 M. I. BURGETT, JR 2,845,575

MAGNETIC DEFLECTION SYSTEM FOR CATHODE RAY TUBES

Filed Nov. 14, 1955

INVENTOR.
MONTE I. BURGETT, JR.
BY
Deemer V. Hazeltine
ATTORNEY

United States Patent Office 2,845,575

Patented July 29, 1958

2,845,575

MAGNETIC DEFLECTION SYSTEM FOR CATHODE RAY TUBES

Monte I. Burgett, Jr., Philadelphia, Pa., assignor to Philco Corporation, Philadelphia, Pa., a corporation of Pennsylvania Application November 14, 1955, Serial No. 546,423

8 Claims. (Cl. 315—27)

This invention relates to magnetic deflection systems for cathode ray tubes, and is particularly applicable to deflection circuits for effecting scanning movement of an electron beam in cathode ray tubes of television instruments, although not necessarily limited to such use.

As is well known, in television instruments such as receivers, the horizontal or line scanning has presented a problem because the sawtooth deflection wave tends to be nonlinear rather than linear, thus tending to cause distortion of the picture. In general, the deflection wave tends to be exponential, with a more rapid rate of change at the start of the scan or sweep than during the later portion thereof.

In prior systems generally, attempts have been made to control the voltage across the deflection coils with a view toward providing linear deflection current and stability. Such systems do not compensate for the effects of the resistance and capacity of the deflection coils. Furthermore, their performance is adversely affected by changes of line voltage or circuit components.

One object of the present invention is to provide an improved magnetic deflection system which overcomes the disadvantages and deficiencies of prior systems.

Another object of the invention is to provide a magnetic deflection system which is more accurate and more stable than prior systems.

A further object of the invention is to provide a magnetic deflection system embodying control means which is adapted to maintain a substantially constant rate of change of the magnetic flux which effects scanning motion of an electron beam of a cathode ray tube.

A further object of the invention is to provide such a deflection system which involves very little additional cost by reason of the control means provided therein.

In accordance with this invention, there is provided what may be aptly termed a "flux clamp" circuit, in association with the deflection coils, the purpose of which, as indicated above, is to maintain a substantially constant rate of change of the flux which effects the scanning action. This flux clamping circuit effectively establishes a predetermined value or level for the rate of flux change, and whenever the rate tends to exceed the established value or level, the flux clamp circuit operates quickly to maintain the change rate of the effective flux at said level. Thus the flux clamp circuit maintains linearity during each scan or sweep interval. An additional advantage of this system is that it is substantially independent of voltage and component changes, provided that the minimum rate of flux change does not fall below the clamp level. Furthermore, the flux clamp circuit is inoperative during retrace, and therefore power loss is held to a minimum.

The invention may be fully understood from the following detailed description with reference to the accompanying drawing wherein.

Figure 1:
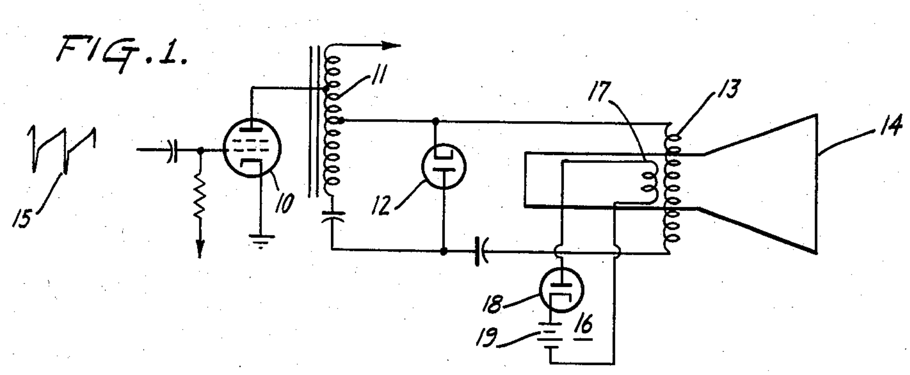
Fig. 1 is a diagrammatic illustration of a deflection system, for horizontal deflection in a cathode ray tube, embodying the present invention.

Referring first to Fig. 1, there is shown a portion of the conventional arrangement for producing the horizontal deflection wave, such arrangement including the output tube 10, transformer 11, damper 12, and deflection coil 13. The latter is associated with the cathode ray tube 14, forming part of the deflection yoke thereon. For simplicity, a single deflection coil is shown, but it will be understood that the deflection yoke actually has two such coils in series or parallel. A signal, such as represented at 15, is supplied to the input of tube 10, and produces a sawtooth current in the deflection coil 13. As well understood, the magnetic flux produced by this current effects horizontal deflection of the electron beam of the cathode ray tube 14 through scanning and retrace motions. Non-linearities of the sawtooth deflection current cause changes or variations of the rate of change of the flux, thereby causing variations of the rate of scanning motion of the electron beam, which in the case of a picture tube cause distortion of the picture.

In accordance with the present invention, there is provided a flux clamp circuit 16 which, as previously stated, effectively establishes a predetermined level for the rate of flux change, and which serves to prevent increase of said rate and to maintain the same substantially at said level, thereby maintaining substantially linear deflection. The circuit 16 comprises a coil 17 inductively associated with the deflection coil 13, a unilaterally conductive low resistance device 18, such as a germanium or silicon diode, and bias-establishing means 19 which is shown in the illustration as a battery. Here again, a single coil 17 is shown for simplicity but in practice there may be a coil associated with each deflecting coil, with the coils connected in series or parallel. In practice, the coil 17 may be placed inside and parallel to the associated horizontal deflection coil, being thus embodied within the deflection yoke. It will be noted that the bias-providing means 19 permits conduction by the diode 18 only when the voltage across coil 17 opposes and overrides the bias. The diode 18 is poled so that it will conduct only during the scan or sweep interval.

Considering the operation of the circuit, the voltage produced across the coil 17 is equal to the time derivative of the flux produced by the current in coil 13; that is to say, the voltage across coil 17 is equal to the derivative $$\frac{d\phi}{dt}$$

$\phi$ is flux and $t$ is time. If the flux were linear, that is if the flux were of true sawtooth form, the voltage across coil 17 would be constant during the scan interval. However, as previously stated, the current in the deflecting coil, and consequently the flux produced thereby, tends to be non-linear; and generally speaking, the slope of the deflection wave tends to be greater at the start of the scan than during the later portion thereof.

The biasing means 19 establishes a bias or clamp level, and permits conduction by the diode 18 only when the voltage across coil 17 exceeds that level. When that happens, the coil 17 is effectively short circuited because of the low resistance of the conducting diode. Consequently heavy current flows in the flux clamp circuit and produces a bucking flux which causes the resultant flux to be substantially linear with time. Thus the flux change with time is clamped to a substantially constant level, provided that the impedance of the coil 17 and the diode 18 are fairly low.

Another way of viewing the operation of circuit 16 is that the coil 17 is coupled to the current in the deflection coil 13, and therefore the circuit 16 eliminates non-linearities due to impedances which tend to produce the non-linearities.

Figure 2:
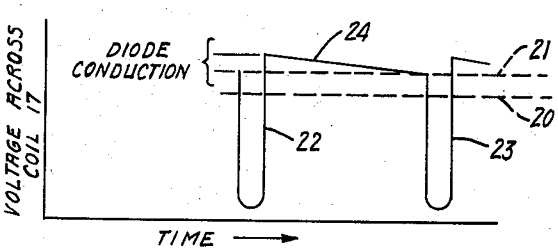
Fig. 2 illustrates the mode of operation of the system.

Fig. 2 shows the form of the voltage across coil 17 produced by the usual non-linear current in the deflection coil 13. The broken line 20 represents the average value of the voltage across coil 17, and the broken line 21 represents the bias or clamp level established by the biasing means 19. This level corresponds to a desired constant rate of change of the deflection wave. The portions 22 and 23 of the graph represent successive retrace intervals, and the intermediate portion 24 represents a scan interval. Initial rise of the voltage above the bias level 21 causes the diode 18 to conduct, and causes heavy current flow in circuit 16. The bucking flux thus produced effectively clamps the deflection flux rate of change to a constant level corresponding to the bias or clamp level 21. Thus the circuit 16 effectively eliminates non-linearities of the deflection wave and causes it to be of desired sawtooth form.

In Fig. 1 the biasing means 19 is shown as a battery, but in practice the bias may be obtained by the use of a parallel R-C circuit connected in place of the battery. If this R-C circuit has a time constant which is long compared to the scan interval, the intermittent current flow in circuit 16 will serve to establish and maintain a constant bias equivalent to that produced by the battery in Fig. 1.

From the foregoing description, it will be seen that this invention provides an arrangement which is sensitive to all non-linearities in the deflection wave, regardless of the causes thereof, and which effectively clamps the rate of flux change to a constant level. Thus this arrangement detects non-linearities of the deflection flux wave and effectively acts upon the wave directly to maintain linearity thereof.

Actual tests have shown that this invention greatly improves linearity and stability of scanning in television receivers. Improvement in linearity of the order of 6 to 1, and improvement in stability of the order of 10 to 20 times, have been achieved by means of this invention. Moreover, these improvements may be obtained at very low cost.

Figure 3:
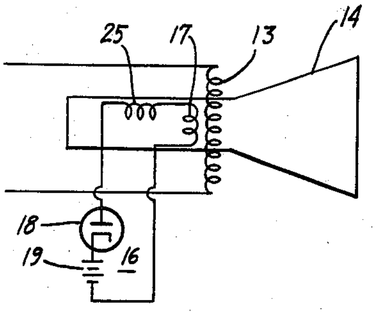
Fig. 3 is a diagrammatic illustration of a modified form of the system.
Figure 5:
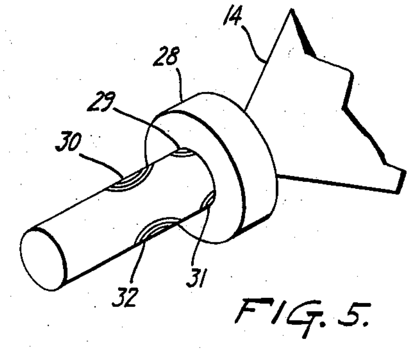
Fig. 5 is a similar illustration showing another arrangement of auxiliary coils.
Figure 4:
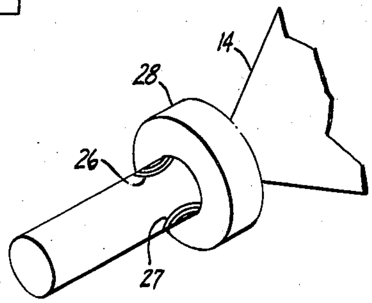
Fig. 4 is a fragmentary perspective view of a cathode ray tube showing one arrangement of the auxiliary coils employed in the practice of this invention.

It is not necessary that the auxiliary coil or coils, employed in the practice of this invention, be located wholly within the deflection yoke. In fact, it may be advantageous to have at least part of each auxiliary coil outside the deflection yoke. Figs. 3 to 5 are illustrative of such modification of the system. Fig. 3 is a fragmentary view similar to Fig. 1 except that a section 25 of the auxiliary coil means is not coupled to the deflection coil 13. Section 25 may be simply an extension of the auxiliary coil 17, or it may be an independent coil in series with the coil 17.

Fig. 4 shows a physical embodiment wherein two auxiliary coils 26 and 27 are partly inside and partly outside the deflection yoke 28 of the cathode ray tube 14. The extending portions of the coils, while not coupled to the deflecting coils, are closer to the electron gun of the cathode ray tube and, therefore, have more influence upon the electron beam.

In Fig. 5, four auxiliary coils 29—30 and 31—32, are shown two inside the yoke and two outside thereof, each pair of coils being series connected. The coils outside the yoke are comparable to the extending portions of the coils in Fig. 4.

In any physical embodiment, the auxiliary coils may be mounted in any suitable manner. For example, these coils may be mounted on a sleeve or open ended cylinder composed of insulating material and slidable over the neck of the cathode ray tube to a position either wholly or partially within the yoke. The auxiliary coils may be wire wound or they may be formed by circuit printing techniques.

While the invention has been described with reference to the illustrated arrangements, it is to be understood that no limitation of the invention thereto is intended, and that the invention contemplates such modifications and further embodiments as may occur to those skilled in the art.

I claim:

1. In a deflection system for cathode ray tubes, a deflection coil to which deflection current is supplied to produce a deflection flux wave in which non-linearities may appear, means for establishing a reference level representative of a desired rate of change of the deflection flux, and means for producing flux opposing the deflection flux whenever the rate of change of the deflection flux exceeds said desired rate, thereby to maintain the effective rate of change of the deflection flux substantially constant at the rate represented by said reference level.

2. In a deflection system for cathode ray tubes, a deflection coil to which deflection current is supplied to produce a deflection flux wave, a low impedance circuit inductively coupled to said coil so that a voltage is induced in said circuit by said coil and tends to produce current therein, and means in said low impedance circuit to establish a voltage threshold for current conduction therein, whereby current of substantial magnitude flows in said low impedance circuit whenever the voltage induced therein exceeds said voltage threshold, and the change rate of the deflection flux is effectively clamped to a substantially constant value.

3. A system according to claim 2, including an auxiliary coil in said low impedance circuit wholly coupled to said deflection coil.

4. A system according to claim 2, including auxiliary coil means in said low impedance circuit only partially coupled to said deflecting coil.

5. A system according to claim 2, including a low resistance diode in said low impedance circuit arranged to permit current conduction therein only during sweep or scan intervals, said threshold-establishing means comprising biasing means for permitting conduction by said diode only when the induced voltage exceeds the bias level.

6. In a deflection system for cathode ray tubes, a deflection coil to which deflection current is supplied to produce a deflection flux wave, a flux clamp circuit inductively associated with said deflection coil so that a voltage is induced in said circuit by said coil, unilaterally conductive means in said clamp circuit having low impedance and arranged to be conductive only during scan or sweep intervals, and means for establishing a voltage threshold in said clamp circuit beyond which said last means conducts, whereby effectively to clamp the change rate of the deflection flux at a substantially constant value.

7. In a deflection system for cathode ray tubes, a deflection coil to which deflection current is supplied to produce a deflection flux wave, and means for substantially eliminating non-linearity of the deflection flux wave, said means comprising an auxiliary coil inductively coupled to said deflection coil so that a voltage is induced across said auxiliary coil by said deflection coil, a unilaterally conductive low impedance device in series with said auxiliary coil and arranged to be conductive only during sweep or scan intervals, and means for establishing a substantially constant unidirectional biasing voltage in series circuit with said device of a polarity to permit conduction by said device only when the voltage across said auxiliary coil exceeds said biasing voltage.

8. A system according to claim 7, wherein said unilaterally conductive device is a diode.

References Cited in the file of this patent

UNITED STATES PATENTS

| | | |
|---|---|---|
| 2,077,574 | Maloff | Apr. 20, 1937 |
| 2,561,586 | Montgomery | July 24, 1951 |
| 2,573,017 | Haworth | Oct. 30, 1951 |
| 2,619,612 | Lawrence | Nov. 25, 1952 |
| 2,677,723 | McCoy et al. | May 4, 1954 |